United States Patent [19]

Niinivaara

[11] 4,393,297
[45] Jul. 12, 1983

[54] METHOD FOR THE ARC CUTTING OF METAL

[75] Inventor: Juhani Niinivaara, Elimäki, Finland
[73] Assignee: Osmo Asonen, Finland
[21] Appl. No.: 286,510
[22] Filed: Jul. 24, 1981
[51] Int. Cl.³ .................. B23K 9/00; B23K 35/00
[52] U.S. Cl. .................. 219/137 R; 219/70; 219/68; 219/72; 219/145.1
[58] Field of Search .......... 219/70, 68, 72, 137.2, 219/137 R, 145.1, 71

[56] References Cited

U.S. PATENT DOCUMENTS

| | | | |
|---|---|---|---|
| 1,412,656 | 4/1922 | Jenkins | 219/137 R X |
| 3,424,054 | 1/1969 | Cook et al. | 219/68 X |
| 4,319,116 | 3/1982 | Kauppi et al. | 219/72 |

Primary Examiner—Elliot A. Goldberg
Assistant Examiner—Catherine Sigda
Attorney, Agent, or Firm—Biebel, French & Nauman

[57] ABSTRACT

Disclosed is an improved method for arc cutting of metal, more specifically a method in which an electric arc is formed between the metal and a cutting torch and gas is blown into the cut during the cutting process. According to the invention a paste is injected through the torch into the region of the arc, said paste containing a finely-divided electrically conducting substance mixed with a carrier and acting as an electrode which causes the electric arc to be struck. The conducting substance may contain e.g. metal powder, such as powder of aluminium or of an aluminium alloy, to which also carbon and phosphorus may be added.

11 Claims, 1 Drawing Figure

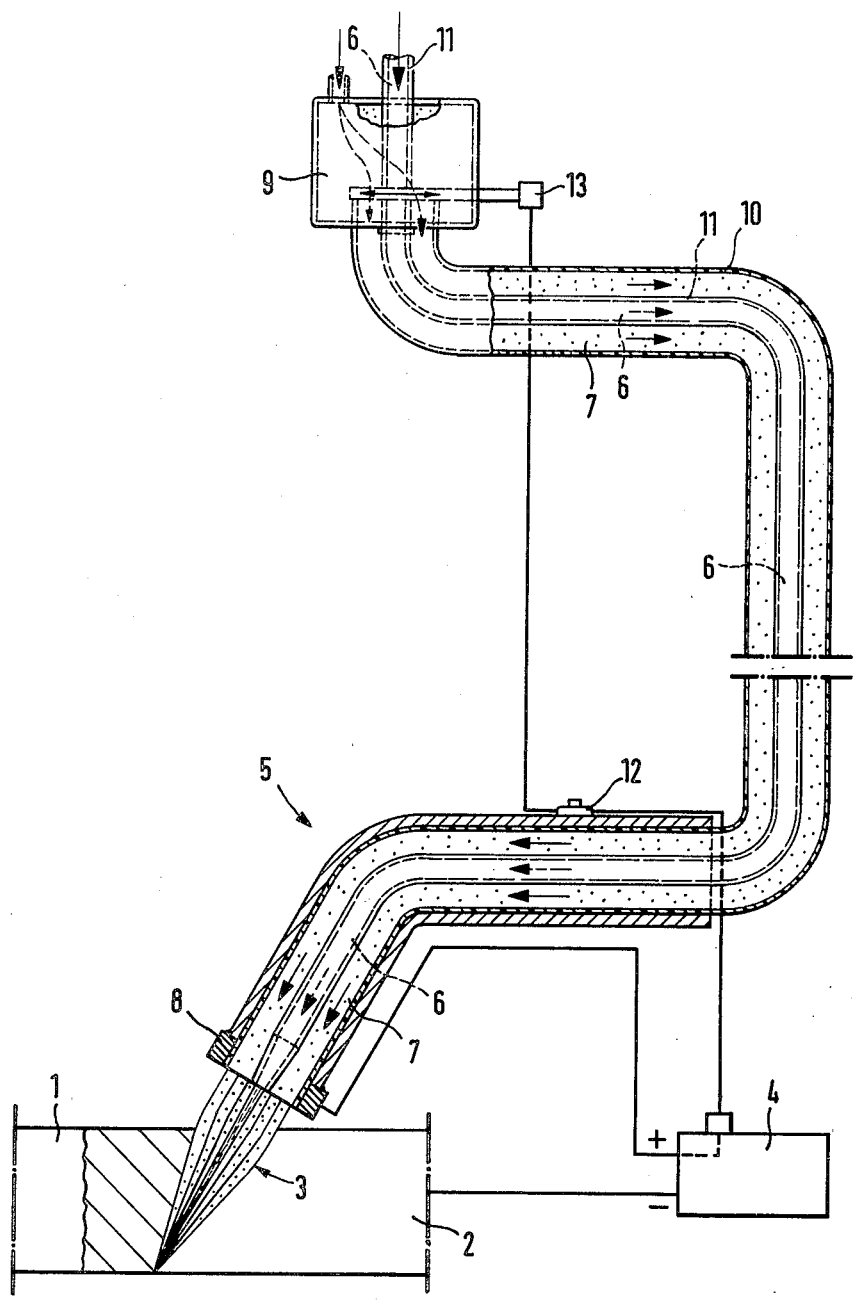

METHOD FOR THE ARC CUTTING OF METAL

BACKGROUND OF THE INVENTION

1. Field of the Invention

The subject of this invention is an improved method for cutting metal, in which method an electric arc is formed between the metal and the cutting torch, the cutting being achieved by simultaneously blowing gas into the cut.

2. Description of the Prior Art

Known methods of cutting based on the use of an electric arc include the TIG and MIG methods, in which the cutting effect of the arc is achieved with the help of a powerful blast of gas. The TIG method employs an electrode which is fixed in the cutting torch. In the MIG method the electrode is a metal wire which is continuously fed through the torch towards the point of cutting. The arc is best struck by bringing the electrode and the metal being cut, which acts as the opposite pole, into contact with each other.

The performance of the known arc cutting methods mentioned above is satisfactory when the cutting can be carried out in good outdoor conditions. In difficult conditions, however, as, for example, when the cutting is performed underwater, these methods are inconvenient and ineffectual. It is not possible be these methods, for instance, to cut several layers of thick metal plates; this is a consequence of the cooling effect of the cold water which penetrates the cut. For this reason, when it is necessary to carry out cutting work underwater, as in connection with repair work on ships, oil-drilling platforms and underwater pipelines, a gas cutting method has been used which is based on melting and burning the metal using oxygen and a liquid fuel, such as petrol. A disadvantage of this method, however, is that considerable quantities of the fuel rise to the surface of the water where they constitute an explosion hazard.

SUMMARY OF THE INVENTION

The purpose of the present invention is to eliminate the drawbacks of known methods as explained above and to provide a cutting method based on the use of an electric arc which is suitable for use in cutting work performed underwater or in otherwise difficult conditions. The invention provides a method of the character once described, wherein the improvement comprises the injection of the paste through the cutting torch into the region of the arc, said paste containing a finely-divided electrically conducting substance mixed with a carrier, so that the aforesaid finely-divided substance acts as an electrode which causes an electric arc to be struck. Contact between the electrode material and the metal being cut thus automatically occurs immediately after the feed of the paste has commenced. The carrier contained in the paste helps to ensure that, even in difficult conditions, the paste penetrates deep into the cut and forms a slag, which promotes the opening of the cut. When used in connection with underwater cutting work, the paste additionally prevents the water coming into direct contact with the molten metal and inhibits the cooling effect of the water.

The finely-divided electrode material in the paste can be, for instance, a metal powder, aluminium powder or powder of an aluminium alloy being the most suitable. In addition the paste may advantageously contain carbon and phosphorus in powder form. Carbon possesses good electrical conductibity, and can be used as an electrode material in addition to or in place of metal. Phosphorus increases both the temperature and the illuminating power of the arc, the later being of considerable significance in underwater work.

The primary function of the carrier in the paste is to bind the electrode material and any other finely-divided constituents so that the paste is of a suitable consistency for feeding through a hose to the cutting torch and thence to the arc. In addition to this, it is advantageous if the carrier is a substance which burns in the arc. The carrier then serves to increase the temperature of the arc and promote its cutting effect. Such combustible materials include soaps, for example soft tall oil soap which is made of sodium salts of tall oil acids. In trails a paste made with soft tall oil soap, suitably thinned with water, has given excellent results.

The principal function of the gas injected into the arc is to blow the molten metal out of the cut. If the gas used is pure oxygen or a mixture containing oxygen it will simultaneously promote the combustion of the constituents of the paste in the region of the arc.

In the method it is moreover advantageous to employ a cutting torch with coaxially arranged channels through which the paste and the gas are led to the arc. The paste is best led through the outer channel so that the finely-divided electrode material in the paste is in contact with the case of the torch, which is connected to the positive pole of the generator used for the cutting.

BRIEF DESCRIPTION OF THE DRAWING

The accompanying drawing illustrates arc cutting of a metal plate according to the present invention.

DESCRIPTION OF THE PREFERRED EMBODIMENTS

In the drawing the metal plate is denoted by the number 1, the cut being made in it by the number 2, and the arc by 3. The arc is struck between the metal plate 1, which is connected to the negative pole of the generator 4, and the cutting torch 5, which is connected to the positive pole of the generator. The cutting torch 5 comprises channels 6 and 7 arranged coaxially, the inner channel being used to lead the gas to the arc. The paste containing the finely-divided electrode material is fed to the arc through the outer channel. Thus the electrode material in the outer channel 7 is in continuous contact with the case 8 of the torch which is connected to the generator 4. The apparatus represented also comprises a pressurized container 9 which contains the paste and which is connected by a flexible hose 10 to the outer channel 7 of the torch 5. The inner channel 6 of the torch is connected by a tube running inside the hose 10 to a gas source which is not represented in the drawing.

The cutting is started by pressing the switch 12 attached to the torch 5, whereupon the valves 13, which are located in connection with the pressurized vessel 9, open and permit the paste and gas to flow to the channels 6 and 7 of the torch. When the paste emerging from channel 7 touches the surface of the metal plate 1, an arc is struck between the plate and the torch 5. This arc begins to melt the metal, and the cut 2 is brought about by the jet of gas issuing from the channel 6 which blows the molten metal aside, away from the cutting point. At the same time the paste injected into the arc spreads to the full depth of the cut and promotes both the burning of the arc and its cutting effect.

The paste injected into the arc through the channel 7 is a mixture, the essential components of which are the carrier and the finely-divided electrode material. In addition to these, the paste may contain other components which promote the cutting effect of the arc or otherwise facilitate cutting, especially in the conditions prevailing underwater. The method has been tried successfully using a paste containing approx. 50% aluminium powder, approx. 15% active charcoal, approx. 5% red phosphorus and approx. 30% soft tall oil soap. The soft tall oil soap in this case contained water in addition to the organic salts, and by this means the paste was made sufficiently fluid. The invention, however, is not restricted solely to a paste of this particular composition, but on the contrary both the quality and percentage proportions of the various constituents of the paste may vary greatly. Thus the carrier can be any soap or suchlike based on fatty acids and/or resinous acids or, for instance, any material based on mineral oil, which has suitable properties. The only essential characteristic is that the base shall together with the electrode material form a paste which it is possible to inject into the arc through the cutting torch. The quantity and quality of the solid materials contained in powder form in the paste can vary similarly; in this respect the essential characteristic is that the paste shall contain at least one electrically conducting constituent which causes an electric arc to be struck by creating a shortcircuit between the cutting torch and the metal being cut.

The gas injected into the arc through the channel 6 is most advantageously oxygen, as this promotes combustion in the region of the arc. Nevertheless it may be appropriate to use other gases or gaseous mixtures which are suitable for opening the cut in the molten metal.

It will be clear to persons skilled in the art that the invention is not in other respects, for example the equipment used, limited to the example given above, but may on the contrary vary within the scope of the accompanying patent claims. It is, for instance, possible to use a torch in which the gas and paste are fed into the arc through a single channel.

What is claimed is:

1. In a method for arc cutting of metal, in which method an electric arc is formed between the metal and a cutting torch, and the cutting is achieved by simultaneously blowing gas into the cut; the improvement comprising injection of a paste through the torch into the region of the arc, said paste containing a finely-divided electrically conducting substance mixed with a carrier, so that the aforesaid finely-divided substance acts as an electrode which causes the electric arc to be struck.

2. A method according to claim 1, wherein a paste containing a metal powder is injected into the region of the arc.

3. A method according to claim 2, wherein the paste contains aluminium powder or powder of an aluminium alloy.

4. A method to claim 2 or 3, wherein the paste additionally contains powdered carbon and phosphorus.

5. A method according to claim 1, wherein the carrier in the paste is a substance which burns in the arc.

6. A method according to claim 5, wherein a soap is used as the carrier.

7. A method according to claim 5, wherein the substance used as the carrier is soft tall oil soap, which consists of sodium salts of acids occurring in tall oil, together with water.

8. A method according to claims 3, 4 or 7, wherein the composition of the paste injected into the region of the arc is approx. 50% aluminium powder, approx. 15% active charcoal, approx. 5% red phosphorus and approx. 30% soft tall oil soap.

9. A method according to claim 1, wherein the gas injected into the region of the arc contains oxygen.

10. A method according to claim 1, wherein the cutting torch has coaxially arranged channels through which the paste and the gas are fed to the arc.

11. A method according to claim 1 intended for use in arc cutting performed underwater.

* * * * *